United States Patent [19]
Baur et al.

[11] Patent Number: 4,589,143
[45] Date of Patent: May 13, 1986

[54] INFORMATION PROCESSING MECHANISM WITH COMBINED PRINTING AND READING DEVICE

[75] Inventors: Rupert Baur; Klaus Dietel, both of Villingen-Schwenningen; Kurt Stöckler, Trossingen; Klaus Tauchert, Villingen-Schwenningen, all of Fed. Rep. of Germany

[73] Assignee: Kienzle Apparate GmbH, Villingen-Schwenningen, Fed. Rep. of Germany

[21] Appl. No.: 487,616

[22] Filed: Apr. 22, 1983

[30] Foreign Application Priority Data

Apr. 23, 1982 [DE] Fed. Rep. of Germany ....... 3215225

[51] Int. Cl.⁴ .............................................. G06K 9/20
[52] U.S. Cl. ........................................ 382/61; 400/73; 400/580; 235/432
[58] Field of Search ...................... 400/73, 580, 583.3; 382/61; 235/432

[56] References Cited

U.S. PATENT DOCUMENTS 3,142,040  7/1964  Zeheb ................................. 382/65
3,250,172  5/1966  Abbott et al. ....................... 382/67
4,165,940  8/1979  Cacciola ............................. 400/124
4,250,526  2/1981  Fuwa et al. ......................... 382/67
4,255,064  3/1981  Kelly ................................ 400/583.3
4,377,741  3/1983  Brekka et al. ...................... 235/432

FOREIGN PATENT DOCUMENTS 2000111  6/1978  United Kingdom ................. 400/580

Primary Examiner—Leo H. Boudreau
Assistant Examiner—Jacqueline Todd
Attorney, Agent, or Firm—Toren, McGeady, Stanger, Goldberg & Kiel

[57] ABSTRACT

An information processing mechanism having a combined printing and reading head wherein the reading head is maintained as close as possible to the printing head by providing means for deflecting light entering the reading head so that the organization of the reading head may be arranged with a reading window thereof through which light enters the reading head arranged adjacent the printing head between a printing needle guide member and a magnet carrier of the printing head, the magnet carrier having a wider dimension than the printing needle guide member.

9 Claims, 4 Drawing Figures

INFORMATION PROCESSING MECHANISM WITH COMBINED PRINTING AND READING DEVICE

The present invention relates generally to an information processing system and more particularly to a system wherein a combined printing and reading device for alphanumeric characters on documents is provided.

It is known in the prior art, for example from German Offenlegungsschrift No. 30 39 124, to arrange in an information processing system a printing head which takes the form of a needle printing device and to also provide a reading head, with the printing head and the reading head being carried on a common slide carrier in order to enable the device to print characters on a document while the document or record carrier is stationary and to also enable the device to read the printed characters.

Devices of the type to which the present invention relates are useful, for example, in the processing of bank books so that when a book is first entered into the information processing device, the entered balance can be read and deposits or withdrawals may be entered with a new balance being listed. However, devices of the type to which the present invention relates are also useful for so-called document coding wherein a combined printing and reading device is useful since it makes possible reading of data already entered on a document and printing of the data on a journal strip in order to subsequently complete the data which are still missing from the document.

However, certain disadvantages arise in this known mechanism because the reading head is arranged at a distance away from the printing head. This had the result that during use considerable limitations arise due to the distance by which the printing and reading devices are spaced from each other. If, for example, reading and printing are to occur intermittently in one operation, then the distance between the reading head and the printing area creates the disadvantage that the document or information carrier cannot have printing applied thereto in an area adjacent the edges. Also, it may occur that data printed at the margin cannot be recognized or read by the printing and reading device due to the fact that movement of the printing/reading member has reached its terminal limits by engagement with one of two lateral stops beyond which the device cannot move.

A further problem which arises in the prior art device involves the fact that the available photoelectric scanning elements are usually designed in such a manner that they have a fairly wide reading range. In particular, such elements may have a reading range which is wider than a line printed on a form or document which is to be processed in the information processing mechanism, the document being for example a bank book. This is necessary because the available reading heads usually are also used, for example, as reading guns for reading of line markings in data terminals in supermarkets and the like.

However, if such photoelectric scanning devices are used for reading of documents or reading of lines in a bank book, then it is always necessary to limit the reading field to the lines which are to be read. Thus, it must be taken into consideration the fact that here the operation is performed with different characters. For example, it should be noted that a conventional reading gun operates with an arrangement of photodiodes which has in one column 64 photoelectric scanning elements while a line in a bank book can engage between 16 and 35 of these photoelectric scanning elements depending upon the type of characters selected. Therefore, it must be possible to adapt the reading heads to the type of characters which are to be processed, i.e., to the line height, which is particularly possible and necessary when, unlike the use in a hand-guided reading gun, the reading head is arranged fixed in relation to the document.

Accordingly, it is a primary object of the present invention to provide an improved information processing device having a combined printing and reading head of the type described in which as few limitations as possible rise during use of the device. In particular, the invention seeks to provide a device wherein the printing and reading areas are as close together as possible.

It is also an object of the invention to provide a device which is capable of locating the last printed line with the combined printing and reading head so that infeed of a document such as, for example, a bank book may be effected with better control by means of a line finding marker, i.e., without requiring that the machine operator inform the machine by activating corresponding keys in order to determine the line in the document or bank book where the next bit of information is to be printed.

SUMMARY OF THE INVENTION

Briefly, the present invention may be described as an information processing mechanism comprising: printing means including a magnet carrier and a printing needle guide member for printing characters on a document, said magnet carrier being relatively larger than said needle guide member taken relative to the vicinity of the printing area; reading head means including optical and photoelectric elements for reading characters printed by said printing means and window means through which light reflected from said document enters said reading head means to enable recognition of characters printed on said document; common carrier means having said printing means and said reading head means mounted thereon for movement thereof relative to a document; and light deflection means contained within said reading head means for directing light incoming through said window means; said reading head means being organized to enable said window means to be located in the immediate vicinity of said printing needle guide member to minimize the spacing between printing and reading of characters on said document with the arrangement of said light deflection means to deflect light between said window means and said photoelectric elements being such as to enable said reading head means to be located in the space in front of said magnet carrier between said magnet carrier and said document.

Thus, in accordance with the present invention, the information processing device is provided with combined printing and reading devices which consist of a needle printing head and a reading head arranged side-by-side on a common carrier. The needle printing head has a magnet carrier with a relatively larger diameter than a needle guide mouthpiece or support member which is relatively narrower in dimension and which is located in front of the printing area. The device of the invention is particularly characterized in that the reading head with its reading window is arranged in the direct vicinity of the needle guide support member and by means of light deflection means inside of the reading head operative between the reading window and the photoelectric scanning elements, the reading head may be located with its optical and photoelectric elements essentially located in the space in front of the magnet carrier or between the magnet carrier and the document.

Consequently, the invention enables utilization of a special shape of the needle printing head which consists of a relatively wide magnet carrier and a relatively narrow printing needle guide or support member in order to enable the reading window to be located as close as possible to the printed area. Consequently, it becomes possible to obtain maximum use of the printed forms or of the forms to be processed while the document is stationary but with the printing and reading heads being moved by the common carrier. It is also possible during movement of the combined printing/-reading head to intermittently read and print without imposing significant limitations in the use of the forms or documents which are processed for example with regard to width or arrangement of data.

Light sources or lamps are provided in order to illuminate the document and since such lamps in the reading head are subject to wear, a lamp carrier is attached on the reading head to enable replacement thereof.

Deflection of the light reflected from the record carrier or document is accomplished by means of a mirror in such a manner that light beams reflected from the document are deflected at a right angle directly behind the reading window so that the light will be directed to the photoelectric scanning device parallel to the document plane wherein previously the light passed a focusing device so that a sharp image of the characters to be read results on the photoelectric scanning means.

As already previously mentioned, the photoelectric scanning arrangement in the device of the invention comprises scanning elements with 16 columns and 64 rows. The means whereby the characters are recognized operates in such a manner that it will serially process light and dark information bits which occur at the photoelectric scanning elements. In accordance with the invention, program means are provided which specify the information rows which are to be conducted for evaluation to the device for character recognition so that only a number of dark areas are recognized which correspond to the height of a character and to the line width which has just been read. The character recognition means can detect for example 16 to 35 rows of scanning elements inside of the photoelectric scanning means.

In accordance with a further development of the invention, during each infeed of a document, a reading preparedness signal is applied by the printing and reading control to a reading transducer and a marking which is generated during each processing of a document, for example a line finding marking, is recognized by the reading signal transducer. A return signal is applied to the printing and reading control in such a way that the document is stopped at the correct position relative to the printed marking.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
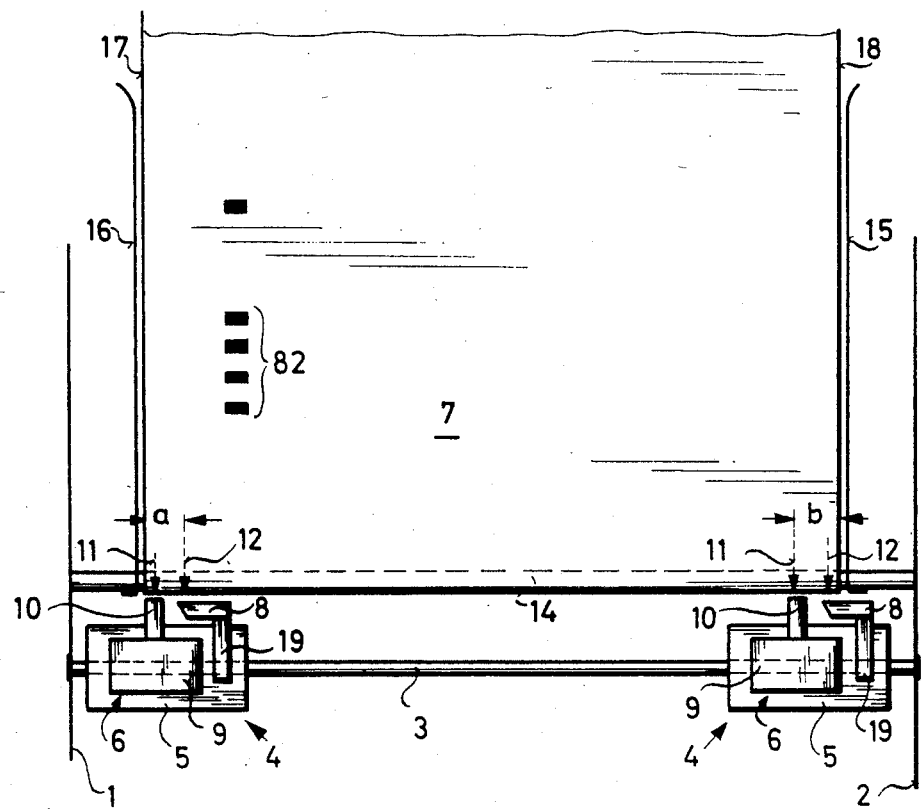
FIG. 1 is a schematic representation of an information processing mechanism having combined printing and reading heads shown with a document which may for example be a bank book.

Referring now to the drawings and more specifically to FIG. 1, it will be seen that the basic information processing mechanism of the invention is arranged to operate relative to a document or record carrier 7 which may, for example, be a bank book or similar record keeping medium. The document 7 comprises side edges 17 and 18 which are arranged between document guide means 15 and 16. The information processing mechanism of the invention basically comprises a combined printing and reading head 4 which is arranged for lateral movement relative to the document 7 on a guide rod 3. The head 4 is adapted for movement between two lateral stops 1 and 2 which may for example be in the form of plates.

The combined printing and reading head 4 consists essentially of a slide 5 which is adapted for sliding engagement relative to the guide rod 3 transversely, i.e., in the line direction, relative to the record carrier or document 7. A needle printing head 6 and a reading head 8 are both arranged on the common carrier or slide 5 with the needle printing head consisting of a relatively large magnet carrier 9 and a needle guide tip 10 having a printing needle which emerges therefrom at a printing area 11. The reading head 8 is located in the space adjacent the needle guide tip 10 and in front of the magnet carrier 9 between the magnet carrier and the document.

Particularly, the optical and photoelectric elements in the reading head 10 are arranged in such a manner that a reading area 12 is located directly adjacent the printing area 11.

Figure 3:
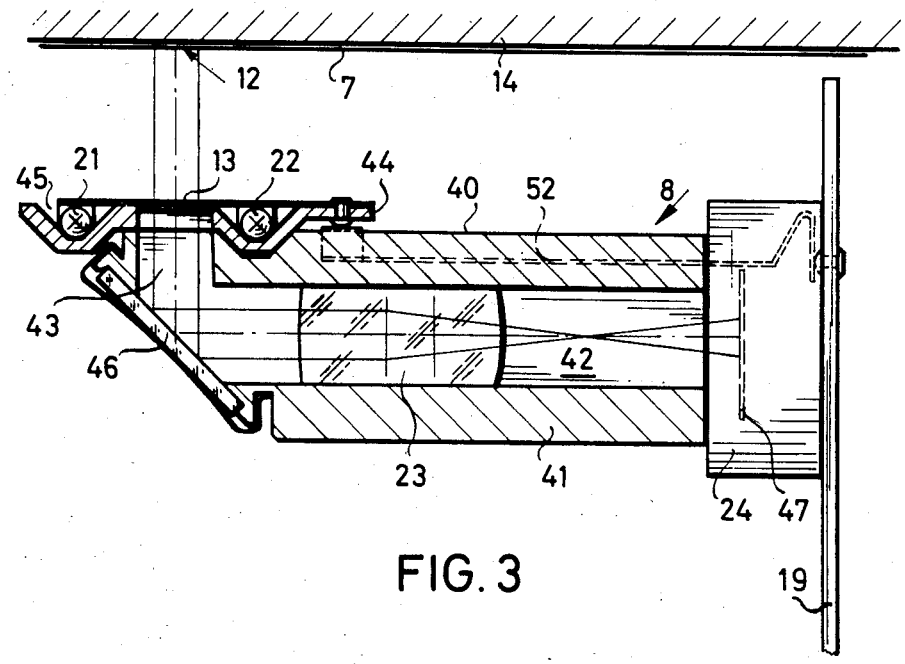
FIG. 3 is a sectional view showing the reading head of the mechanism of the invention.
Figure 4:
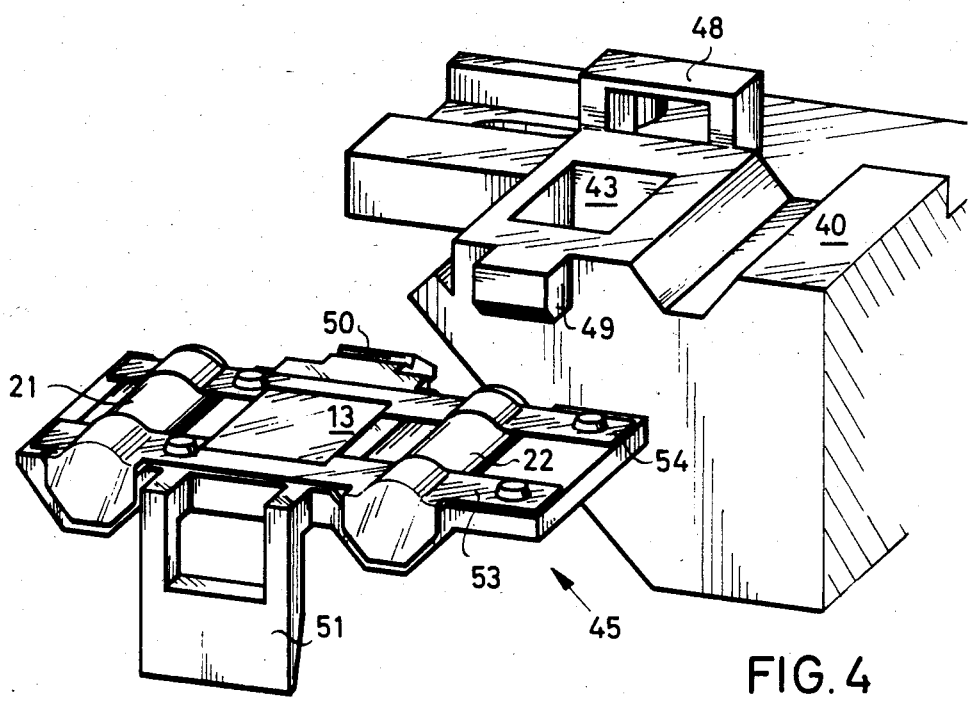
FIG. 4 is a perspective view showing parts of the reading head disassembled.

The reading head 8 which is shown in greater detail in FIGS. 3 and 4 consists essentially of a reading window 13 which defines the reading area 12 and through which light reflected from the document 7 enters the reading head 8.

A line 14 indicates or represents the printing base or line along which the document 7 is imprinted and upon which also the reading area 12 of the reading head 8 is located. The document 7 is held and guided by means of the guide means 15, 16 in a position in front of the printing base 14 so that a defined position of the document 7 results. The document 7 rests with its two lateral edges 17 and 18 at the guides 15 and 16. The guides 15, 16 are usually movable but in the present case they are arranged in such a way that the slide 5, when it is limited by the lateral stop 1 at its leftmost position, will be arranged with its printing area 11 located at the initial portion of the document or record carrier 7.

The distance between the printing area 11 and the reading area 12 is indicated in FIG. 1 as a. Due to the special construction of the reading head which is shown in greater detail in FIGS. 3 and 4, the mechanism of the invention ensures that the distance a will be maintained to a minimum or as small as possible. No data which also must be read can be printed within the distance or space a by the printing head 6. Of course, the smaller the distance a, the less organizational limitations that will be imposed upon the information processing mechanism.

Referring to FIG. 1, when the slide 5 is at its rightmost position, it will strike against the lateral stop 2. At this position, a distance b will exist across which reading of characters would be possible, but through which no printing can be effected due to the fact that the needle guide tip 10 cannot move into the space b after the slide 5 has engaged against the stop 2. However, it will be evident that the distance b as well as the distance a will be reduced to a minimum if the needle printing head or tip 10 and the reading head 8 are maintained as close to one another as possible. In accordance with the present invention, by enabling close proximity between these members the spaces or distances a and b are reduced to a minimum.

The special construction of the reading head in accordance with the present invention whereby the margins a and b may be reduced to a minimum is shown in FIGS. 3 and 4. In FIG. 3 it will be seen that the reading head 8 is formed with a channel 42 which is defined between a wall 40 and a wall 41 and that within the channel 42 an optical focusing element 23 which consists of several lenses is arranged. A channel 43 is provided behind the reading window 13 through which light entering the window 13 passes. Light sources in the form of lamps 21 and 22 are arranged on both sides of the reading window 13 with the lamps being located in a lamp support 44 which is constructed with a reflector 45 located behind the two lamps 21 and 22. Light from the lamps 21, 22 is focused by the reflectors 45 and impinges the document 7 at the print line 14 in the reading area 12. The light is then reflected by the document and enters the reading window 13 and passes through the channel 43 and impinges a mirror 46. From the mirror 46 the light is deflected through the optical focusing element 23 until an image of the reading area 12 on the printing line 14 forms on an image plane 47. The image plane 47 is a component of a photodiode arrangement 24. The lamps 21, 22, the mirror 46, the optical focusing element 23, and the photodiode arrangement 24 form the optical and photoelectric means of the reading head 8 which are located in a space adjacent the needle guide tip 10 and in front of the magnetic carrier 9 of the needle printer 6.

Figure 2:
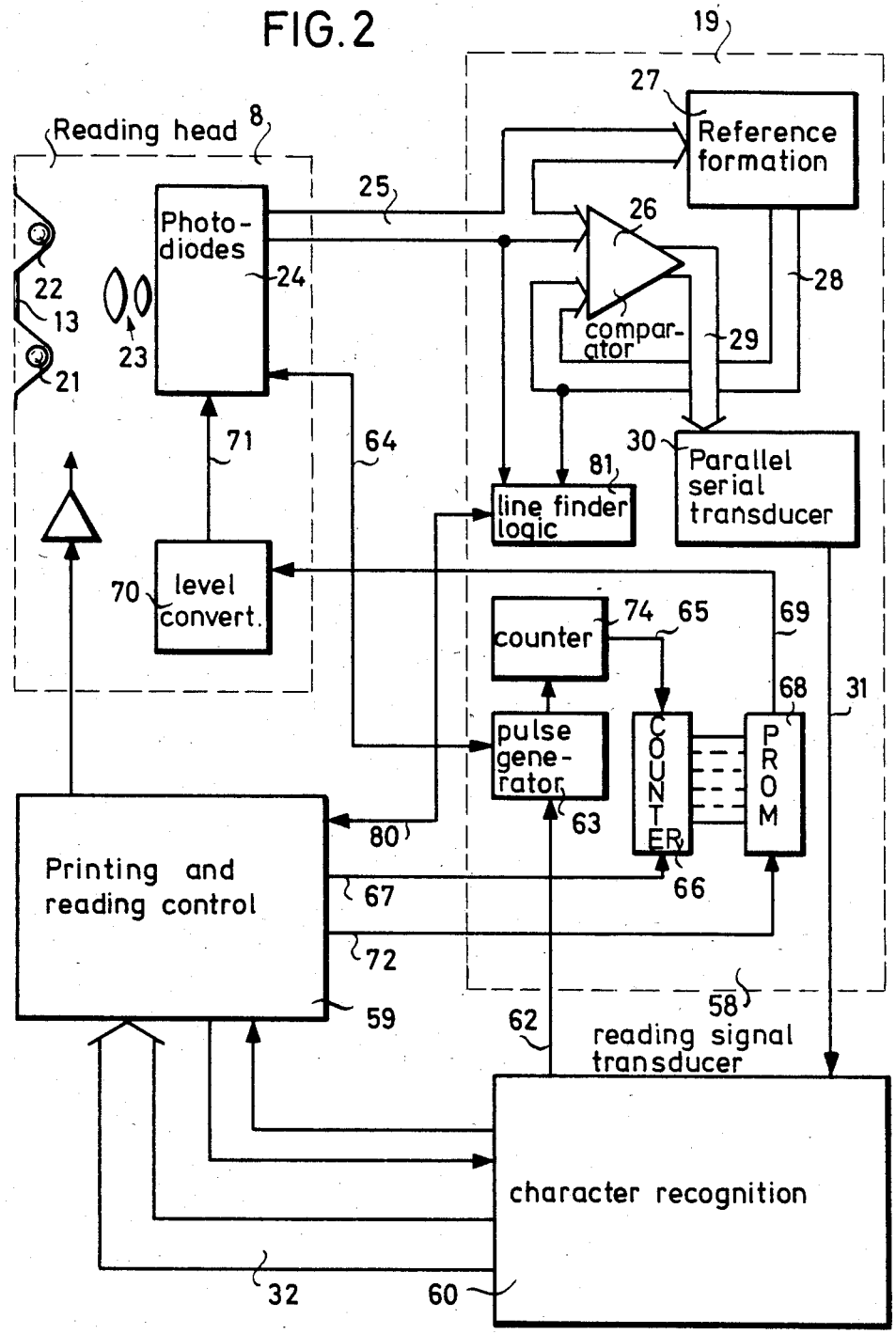
FIG. 2 is a block circuit diagram of the system of the invention.

FIG. 2 shows, in block diagram form, the overall circuit arrangement of the system. The photodiode arrangement 24 is a component of a circuit board 19 which carries the structural elements which represent a reading signal transducer 58 shown in FIG. 2.

FIG. 4 shows in exploded view in perspective how the reading window 13 and the lamp support 44 are constructed. Since the lamps 21 and 22 relate to parts which are subject to wear, the lamp support 44 is exchangeably fastened to the reading head 8. For this purpose, the reading head 8 is provided at the wall 40 with a bracket 48 and a projection 49. The lamp support 44 has a detent 50 which engages into the bracket 48 and a bracket 51 into which the projection 49 engages. Power supply to the lamps 21 and 22 is provided by means of conductors 52 and conductors 53 and 54.

As will be seen from FIG. 2, the circuit arrangement of the invention consists on the one hand of the reading head 8 and on the other hand of the reading signal transducer 58 formed on a printed circuit board 19 and also of the printing and reading control 59 and of the character recognition means 60. The printing and reading control 59 operates to control the combined printing and reading head 4 in relation to printing and reading. The circuit for the character recognition means 60 operates to recognize printed characters from serially entering light-dark patterns which are compared with prototype patterns representing characters in order thereby to determine which character has been presented.

Inside of the reading head 8, the photodiode arrangement 24 and the photoelectric scanning element comprise a $16 \times 64$ matrix of photoelectric scanning elements or photodiodes wherein 16 photodiodes are always arranged in one row and 64 photodiodes are arranged in one column.

Scanning of the photodiode arrangement 24 occurs in cadence by the character recognition means 60 under interposition of the reading signal transducer 58. Within the arrangement 24, the 16 diodes of one row are simultaneously scanned and all 16 information bits are conducted via a carrier 25 to a group of comparators 26. These 16 information bits are also conducted to a reference formation means 27 by a branch of the carrier 25. The reference formation means 27 operates to continuously perform a median value of the degree of reflection in that a measurement of the degree of reflection occurs by means of all $16 \times 64$ photodiodes and from these values a median value is developed. This median value is transferred by carriers 28 to the additional inputs of a group of comparators 26 in order there to be compared with input values of individual diodes which are fed in by means of the carrier 25.

During a comparison with the median value, an analog-digital value transformation occurs by means of the comparator 26 in that only information of contrast values of the diodes is conducted further in which a dark area has been scanned. This digital information is fed through the carrier 29 to a parallel serial transducer 30 which consists of two eight-bit shift registers. in other words, the yes-no statements of the photodiodes which are scanned in parallel are stored in parallel in the shift register 30 and they are read out in series. Consequently, a parallel serial transformation takes place in the shift register 30 and the information is fed through the carrier 31 to the character recognition means 60 where individual information bits are again combined and are compared with prototype characters. The recognized information bits are then fed through a carrier line 32 to the printing and reading control 59 which makes the characters available for printing by the printing head 6.

A character on the document 7 will not have a width as the photodiode arrangement which covers 64 scanning elements in one column. Rather, a character covers only between 16 and 35 photoelectric scanning elements in the diode arrangement 24. Therefore, a selection must be made as to which signals are to be released by the photodiode arrangement for evaluation in the character recognition means 60 and then fed after completed identification to the printing and reading control. This occurs in a manner whereby through the character recognition means 60 a pulse generator 63 in the reading signal transducer 58 is controlled through a line 62. The pulse generator in turn applies clock pulses by means of an additional line 64 to the photodiode arrangement 24 in such a manner that the first row of 16 photodiodes is always scanned and then the second row, etc., up to the 64th row. The pulse signals of the pulse generator 63 are counted in a four-bit binary counter 74 which always after 16 pulses generates an output signal through the line 65 to the counter 66. The counter 66 will then always count from one to 64, i.e., it is switched in the cadence of the scanning of the individual rows of photodiodes in the arrangment 24.

The counter 66 is activated by the printing and reading control 59 through a line 67, i.e., a signal is given by the printing and reading control 59 to the counter 66 when a reading process is to occur.

The individual binary outputs of the counter 66 are connected with a PROM 68. A level converter 70 is controlled by the PROM by means of a line 69. In the PROM, the reading window for the photodiode arrangement 24 is programmed, that is, a closing or opening signal is given by the PROM through the line 69 to the level converter 70. When the level converter 70 generates a closing signal to the photodiode arrangement 24 by means of the line 71, then corresponding signals which are read in these rows of the photodiode arrangement are not further processed in the reading signal transducer 58 and there is always no forwarding of the character recognition means 60.

However, when the PROM 68 gives an opening signal by means of the line 69 to the level converter 70, then the corresponding signals representing dark areas are processed in the comparators 26 and they are serialized in the shift registers 30 and forwarded to the character recognition means 60.

Since the reading signal transducer 58 is to be constructed in such a manner that it can recognize under certain circumstances two different character widths, the PROM 68 is also controlled by an additional signal from the printing and reading control 59 through a line 72 in such a manner that different reading windows are made available at the PROM 68, for example in one case the rows 18 to 25 and in another case the rows 16 to 30 of the photodiode arrangement are masked. By exchanging the PROM, it is of course also possible to adapt the reading signal transducer 59 to any desired scanning width in the arrangement 24.

During specific work processes, the printing and reading control 59 provides a preparedness signal to the line finder logic means 81 by means of the line 80. The line finder logic means 81 is connected on one side with the carrier line 25 and on the other side with the line 28 which supplies the median value from the reference formation means 27. It should be noted that on the document 7, and particularly if it is a bank book, a line finder marking 82 is produced during each printing. When a new document is drawn in, a corresponding signal to the line finder logic means 81 is generated by the printing and reading control 59 as previously mentioned. During drawing in of a document, as soon as a marking 82 passes the reading head 8, a signal is generated in the line finder logic means 81 which again imparts a return signal through the line 80 to the printing and reading control 59 whereby the document may be stopped in the correct position, i.e., at the correct line, with the next line to be printed.

Accordingly, from the foregoing disclosure it will be seen that the present invention relates to an information processing device having a combined printing and reading head 4 operable to print on documents and for intermittent reading of the entries on such documents. The reading head 8 is arranged on a carrier 5 next to the needle printing head 6 in such a manner that the reading window 13 lies as close as possible to the needle guide tip 10. Thus, the reading window 13 is, in accordance with the present invention, capable of being located in the space directly in front of the magnet carrier 9 of the printing head 6. During use of the printing and reading head 4 this results in organizational advantages in that unusable space between the printing area 11 and the reading area 12 is reduced to a minimum and consequently also the space in which either printing or reading can occur is also reduced to a minimum. By means of a programmable unit 66, 68, it is possible to mask certain lines at the photodiode arrangement 24 which is a component of the reading head 8 and to only forward desired information. The reading head 8 can also be used to recognize a line finding symbol or other similar mark 82 and during the process of entering the document 7 into the information processing mechanism, this can operate to stop the feed control of the entry process in such a manner that it will stop on the next available free line for printing.

While a specific embodiment of the invention has been shown and described in detail to illustrate the application of the inventive principles, it will be understood that the invention may be embodied otherwise without departing from such principles.

What is claimed is:

1. An information processing mechanism having a combined printing and reading device for processing characters on documents comprising a record carrier for holding said documents, a needle printing head and a reading head arranged adjacent one another, a common carrier having said printing head and reading head mounted thereon, said common carrier being mounted for reciprocating movement in front of said record carrier between two defined end positions with said needle printing head including a magnet carrier and a needle guide member extending from said magnet carrier toward said record carrier, said needle guide member having a smaller dimension than said magnet carrier taken in the direction of said reciprocating movement of said common carrier, and with said reading head comprising optical and photoelectric scanning elements, means defining a reading window through which light may pass to said optical and photoelectric scanning elements and light beam deflection means inside said reading head arranged between said reading window and said photoelectric scanning elements, said reading head having said reading window arranged in side-by-side relationship with said needle guide member to cooperate along the same line on said record carrier, with said light deflection means inside said reading head being arranged between said reading window and said photoelectric scanning elements in an arrangement whereby said reading head with its optical and photoelectric elements is located to occupy the space between said magnet carrier and said record carrier alongside said needle guide member, with said photoelectric elements being located on a side of said reading window away from said needle guide member to enable said needle guide member and said reading window to be in as close a proximity as possible.

2. A mechanism according to claim 1 further comprising light sources arranged at both sides of said reading window and reflectors for said light sources, said mechanism further including lamp support means having said light sources and said reflectors formed therewith as a replaceable unit.

3. A mechanism according to claim 2 further including a mirror arranged to have light entering through said reading window impinge thereon, said optical and photoelectric scanning elements including an optical focusing member arranged between said mirror and said photoelectric scanning elements with light coming from said light sources and reflected from a document entering said reading window and impinging said mirror to be deflected through said optical focusing member onto said photoelectric scanning elements.

4. A mechanism according to claim 1 wherein said photoelectric scanning elements comprise rows of elements, said elements being successively scanned in rows to determine the presence of dark areas representing information on a document, and character recognition means wherein it is specified by a program which information rows are released for evaluation.

5. A mechanism according to claim 4 further comprising a counter wherein for each position of said counter there corresponds a row of scanning elements, a PROM wherein masking of specific counting positions takes place, and a level converter controlled by said PROM to determine rows of said scanning elements through which information represented by dark areas on said document is to be processed.

6. A mechanism according to claim 5 further including a printing and reading control to provide selection signals to said PROM in order to release different line widths for further processing.

7. An information processing mechanism comprising:
  printing means including a magnet carrier and a printing needle guide member for printing characters on a document, said magnet carrier being relatively larger than said needle guide member taken relative to the vicinity of said printing area;
  reading head means including optical and photoelectric elements for reading characters printed by said printing means and window means through which light reflected from said document enters said reading head means to enable recognition of characters printed on said document, said optical and photoelectric elements being arranged relative to said window means spaced therefrom along a path parallel to the plane of said document;
  common carrier means having said printing means and said reading head means mounted thereon for movement thereof relative to a document;
  means mounting said common carrier means for reciprocating movement relative to said document between two fixed terminal positions; and
  light deflection means contained within said reading head means for directing light incoming through said window means;
  said light deflection means being arranged to direct light incoming through said window means to said optical and photoelectric elements in a direction along said path parallel to the plane of said document;
  said reading head means being organized with said optical and photoelectric elements being located to occupy the space between said magnet carrier and said document alongside said needle guide member, said optical and photoelectric elements being located on a side of said window means opposite said needle guide member to enable said window means to be located in the immediate vicinity of said printing needle guide member to minimize the spacing between printing and reading of characters on said document with the arrangement of said light deflection means to deflect light between said window means and said photoelectric elements being such as to enable said reading head means to be located in the space in front of said magnet carrier between said magnet carrier and said document.

8. A mechanism according to claim 7 wherein said printing needle guide member extends in the form of a tip toward said document from said magnet carrier and wherein said magnet carrier is wider, taken in the direction of movement of said common carrier means, than said printing needle guide member so that said window means may extend adjacent said printing needle guide member between said document and said magnet carrier.

9. A mechanism according to claim 7 further comprising optical focusing means located within said path parallel to the plane of said document in between said light deflection means and said optical and photoelectric elements.

* * * * *